UNITED STATES PATENT OFFICE.

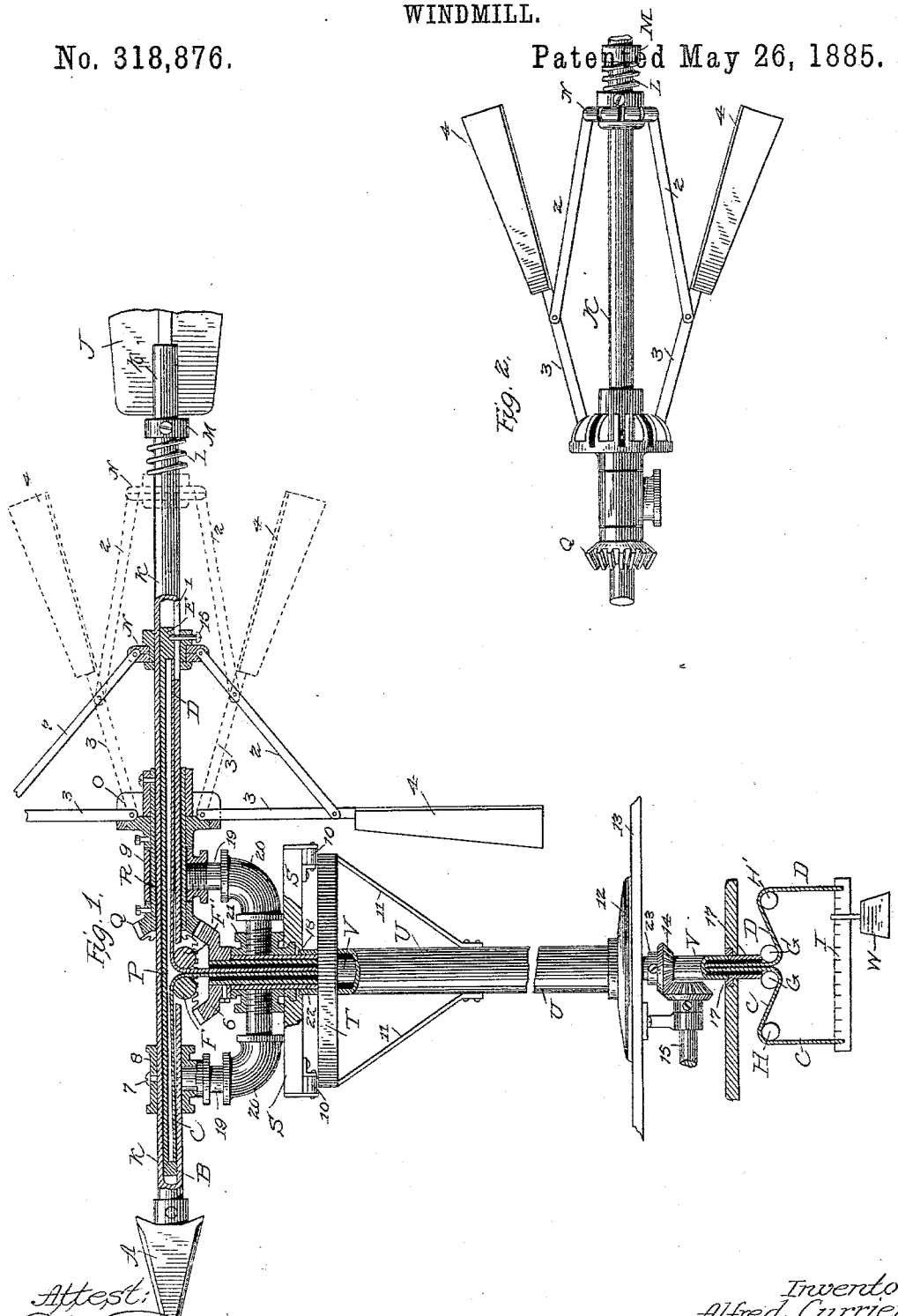

ALFRED CURRIER, OF GRAND RAPIDS, MICHIGAN, ASSIGNOR OF ONE-HALF TO W. H. DE CAMP, OF SAME PLACE.

WINDMILL.

SPECIFICATION forming part of Letters Patent No. 318,876, dated May 26, 1885.

Application filed December 10, 1884. (No model.)

*To all whom it may concern:*

Be it known that I, ALFRED CURRIER, of Grand Rapids, in the county of Kent and State of Michigan, have invented a new and useful Improvement in Automatic Windmills; and I do hereby declare that the following is a full, clear, and exact description of the same.

My invention is an improvement upon windmills of that class in which the wheel is composed of radial arms and fans mounted upon a horizontal shaft.

The object of my invention is to more effectually reduce the amount of surface of the wheel automatically when the force of wind against said surface exceeds a certain determined amount.

The leading feature of the invention consists of pivoted fans carrying arms adapted to close upon or toward the main shaft when under excessive pressure of wind. Subordinate to these main features are details of construction whereby the main part is effectually embodied in a practical operative windmill.

In the accompanying drawings, Figure 1 shows the machine mainly in side elevation, but with parts hereinafter explained in longitudinal section. Fig. 2 shows a portion of the machine with the fans closed in side elevation.

In the drawings, U represents the main supporting-column, and K the main supporting-shaft of the machine. The shaft K is tubular in form, and carries upon one end a counterbalance-head, A, and upon the other a fan, J. It is fitted in bearings upon the main supporting parts, and is held rigidly by a set-screw, 7, in the sleeve 8, which forms one of the bearings of the shaft. The other bearing is shown at R, and, like the bearing 8, is in the form of a three-way coupling. The bearing R incloses a sleeve, 9, which extends out each end beyond the bearing R. To one end of the projecting sleeve 9 is fixed the hub O of the wheel. To the other end is fixed a bevel-gear, Q. The sleeve 9 and the bevel-gear Q turn with the hub of the wheel upon the main tubular shaft K. The bearings R and S are screwed upon short pieces of pipe 19, set in bent couplings 20, which couplings are connected to a double-T head, 21, set on the top of the hollow column U. This head of double-T form rests at 18 in the carriage S, with which it turns upon a track or table, T, which is supported against lateral pressure by a tubular shaft, 22, to which it is fixed, and which extends down within the main tubular column U. The tubular shaft 22 therefore forms the spindle on which the head and carriage turn. The table T forms the support for the whole. The said table travels upon wheels or rollers 10 10. Inside the tubular shaft 22 is another tubular shaft, 23, upon the upper end of which is fixed the bevel-gear 6, meshing with the bevel-gear Q. The bevel-gear 14, in mesh with another gear on the horizontal shaft 15, is fixed to the lower end of the shaft 23. Thereby the power of the wheel is transmitted to any desired point. The hub of the wheel is slotted in places radial to the center of the hub, and in these slots are pivoted the arms 3, carrying the fans 4. The fans are fixed to the arm at any desired or suitable angle, and are adapted to fall down upon the shaft, as shown in dotted lines in Fig. 1, like the ribs of an umbrella. The arms 3 are connected to a sliding ferrule, N, by means of braces 2, the ferrule N being adapted to move upon the main shaft K from a position shown in full lines, Fig. 1, to that shown in dotted lines, the whole action and the construction in its main features being similar to that of an umbrella.

The main tubular shaft K is slotted, as shown at 1, the slot extending beyond the position indicated, and a screw, 5, passing through the ferrule N and through the slot, connects the ferrule to a sliding plug, E. The rope D is laid over a pulley, F', and down the hollow shaft 23 another rope, C, passes to the plug B, and is led over the pulley F down the interior of the same shaft. Pulling upon the rope D will open and pulling upon the rope C will close the fans. These ropes are led over pulleys G G' and H H', and are attached to a lever, *l*, and provided with an adjustable weight, W. The weight being placed nearer to the rope D will tend to hold the fans open against the force of the wind, and the position of the weight will determine the resisting force of the fans. This can be adjusted to any desired point or degree.

The shaft 23 is stepped into the support 16. The support 12 upon the floor 13 carries the main tubular shaft U. At 17 is shown a continuation of the tube 23 for guiding the ropes C D.

I have provided upon the shaft K a spring, L, which rests upon a collar, M, to receive the ferrule N and break the shock when the fans close.

I do not limit myself to the particular construction of the lever and weight, as many other devices may be used for holding the fans to the wind; nor, indeed, do I limit myself to the details of construction hereinbefore described, as they may be correctly varied without departing from the spirit of my invention.

I claim as my invention—

1. The combination, in a windmill, of a main tubular shaft, a hub on said shaft connected with gears for transmitting the power, fans pivoted on said hub, a sliding ferrule, N, mounted on the main shaft and connected to the fans, and a sliding block within the shaft secured to the ferrule and connected with devices, substantially as described, for regulating the movement of the ferrule, the said fans being adapted to close upon or toward the shaft by pressure of the wind, substantially as described.

2. The combination, in a windmill, of the main tubular shaft K, supported on a turn-table, a hub carrying pivoted fans and fixed to a sleeve, R, mounted on the said shaft K, a bevel-gear on the front of said sleeve meshing with a like gear on the end of a vertical tubular shaft, a sliding block within the shaft K, having a rope, D, connected to the end E thereof, and connections between the block and the fans, whereby the said fans are opened, all substantially as described.

3. The combination, in a windmill, of a main tubular shaft, a hub fixed to a sleeve carrying a bevel-gear, which meshes with a like gear on a vertical tubular shaft for communicating power, fans pivoted on said hub and connected to a sliding ferrule, N, mounted on the tubular shaft and fixed to a sliding block within the tubular shaft K, and means, substantially as described, connected to the ends B E of the sliding block, for operating and regulating the pivoted fans, all as set forth.

4. The combination, in a windmill, of the main tubular shaft K, the hub carrying the pivoted fans connected to the ferrule N, said fans being adapted to close toward or upon the shaft, and with a sliding block within the shaft K, having the rope D connected to the end E thereof, for opening the fans through the said ferrule, the sleeve R serving as a rear bearing for the shaft K, and supporting the hub O and the front bearing, S, the said bearings being supported from the turn-table and encircling the tubular shaft, all as described, and for the purpose set forth.

In testimony whereof I have signed my name to this specification in the presence of two subscribing witnesses.

ALFRED CURRIER.

Witnesses:
ARTHUR U. CURRIER,
WM. G. BECKWITH.